MAGNETIC TAPE TRANSPORT

Filed July 16, 1962

INVENTORS.
ROBERT G. NORDMAN
HARRY F. RAYFIELD
BY Christie Parker & Hale
ATTORNEYS.

United States Patent Office 3,185,365
Patented May 25, 1965

3,185,365
MAGNETIC TAPE TRANSPORT
Harry F. Rayfield, Arcadia, and Robert G. Nordman, Pasadena, Calif., assignors to Burroughs Corporation, Detroit, Mich., a corporation of Michigan
Filed July 16, 1962, Ser. No. 209,871
8 Claims. (Cl. 226—50)

This invention relates to magnetic tape transports, and more particularly, is concerned with a high-speed digital tape transport apparatus capable of rapid starting and stopping.

Magnetic tape has come into extensive use for storing large amounts of information in digitally coded form for use in data processing equipment. There has been a continuous effort to increase tape drive speeds to reduce the time necessary to record and read out information from the tape and to scan the tape for particular pieces of information. In addition to high tape speeds, good digital tape transports require the tape to be brought up to speed in either direction in a minimum of time to reduce the length of tape required in starting, stopping and reversing the tape. At the same time, the tape drive must provide accurate guidance of the tape across the transducer head to insure complete reproducibility in high density recording. All of this must be accomplished without stretching or otherwise damaging the tape and must be accomplished with a minimum of wear on the edges and magnetic surfaces of the tape.

Because the tape is stored on reels which can only be accelerated and decelerated at relatively slow rates because of their relatively large mass, it has been customary to provide a capstan drive of the tape in the operational zone where the magnetic heads are located. Pinch rollers, for example, selectively engage the tape with one or the other of oppositely rotating capstans to drive the tape in either direction past the magnetic heads. Suitable buffers, such as vacuum columns, have been used to provide slack loops between the reels and the operational zone to accommodate the difference in acceleration rates of the tape at the reels and in the operational zone.

Even though the vacuum columns materially reduce the mass which has to be accelerated when the tape is engaged with a capstan, nevertheless with very high terminal tape speeds there is still a substantial load to be accelerated in bringing the tape up to speed in the operational zone. When the pinch roller engages the tape, the tape is momentarily stretched against the resistance and inertia of the tape in the vacuum column and, as a result, the acceleration of the tape in the region of the magnetic head, due to the inherent springiness of the tape, is not smooth but jerky. The time necessary for the tape to settle down to a smooth continuous speed in the region of the magnetic head may be appreciable in terms of the amount of information that could be passed in that time. The same problem, of course, exists when the tape is suddenly reversed in direction.

Other problems encountered in prior art digital tape transports include the problems of braking the tape to a stop and guiding the tape without incurring undue wear and breakage of the tape. Braking means which clamp the tape cause frictional wear of the tape surface, and have the additional disadvantage that such braking means involve moving parts which introduce a lag time in their action, as well as the wear and breakage problems involved in any mechanical system having moving parts.

The present invention provides a tape transport having a unique design which gives a much smoother and more rapid acceleration and deceleration of magnetic tape in the operational zone during starting and reversing of the tape drive. In addition, it provides a braking action on the tape when the tape drive is disengaged, the method of braking the tape utilizing no moving parts and introducing no frictional engagement with the active magnetic surface of the tape other than the transducer heads themselves. In addition, the present invention eliminates the need for compliant guides engaging the tape edges.

These and other advantages of the present invention are achieved by providing, in a tape transport apparatus having first and second capstan drives in the operational zone on either side of a magnetic tape transducer head, a pair of guide members located on either side of the transducer head between the capstans. Each guide member includes an elongated block having a channel portion for receiving and guiding the tape. The block is arranged with a stationary cylindrical guide post adjacent one end of the channel portion nearest the head and has a small pocket in the bottom of the channel portion adapted to receive a small loop of tape as the tape passes over the surface of the post. The guide post is positioned such that the tape passes over one capstan through the channel portion partially and around the cylindrical guide post of one guide member, under the transducer head, around the cylindrical guide post of the other guide member and through the channel portion to the other capstan. Each of the pockets is evacuated so that normally the tape is drawn into the pockets against the tension of the tape.

For a more complete understanding of the invention, reference should be made to the accompanying drawings wherein.

Figure 1:
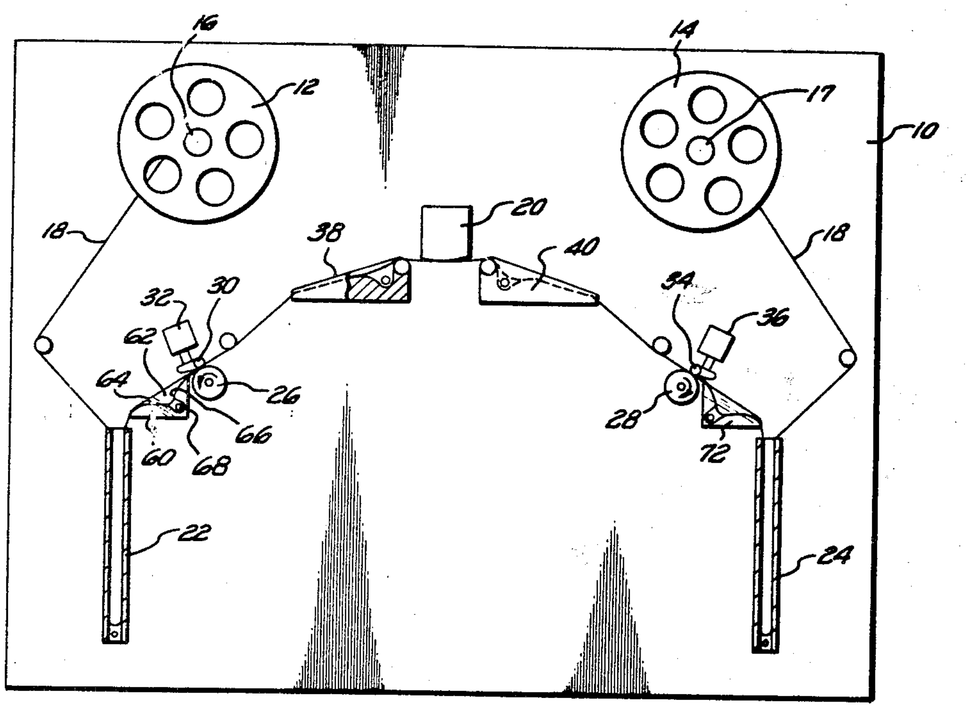
FIGURE 1 is a diagrammatic representation of one embodiment of the invention.

Referring to FIGURE 1 in detail, the numeral 10 indicates generally the frame plate of the magnetic transport apparatus. The tape is stored on and transported between a pair of tape reels 12 and 14 which are movably secured to rotating hubs 16 and 17, respectively. These hubs are driven by reel drive motors (not shown) in conventional manner, such as shown in Patent No. 2,921,753. The tape, indicated at 18, in passing from one reel to the other, goes through an operational zone including a magnetic transducer head 20. Between the respective reels and the transducer head 20 are located a pair of vacuum columns 22 and 24 which are arranged to maintain slack loops in the tape between the operational zone and the respective reels. A differential pressure across the tape loops in the columns keeps the tape in tension. Suitable sensing means (not shown) senses the lengths of the loops in the vacuum columns, and provides through suitable controls, the proper drive speed on the reels, such as is taught in the above-identified patent.

Movement of tape through the operational zone is effected by a pair of capstans 26 and 28 rotatable in opposite directions by suitable capstan drive motors (not shown). The tape is engaged with the capstan 26 by means of a pinch roller 30 operated by a suitable solenoid actuator 32. The tape is driven in the opposite direction by means of a pinch roller 34 which engages the tape with the capstan 28. The pinch roller 34 is actuated by a suitable solenoid actuator 36. The transport as thus far described is of a generally conventional design.

Figure 2:
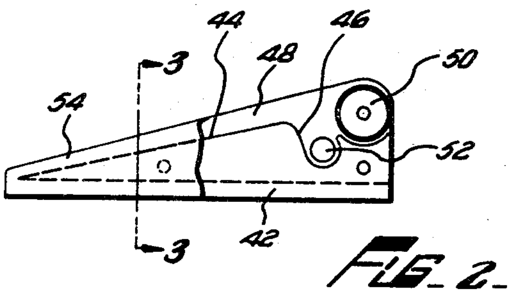
FIGURE 2 is a detailed plan view of the guide block.
Figure 3:
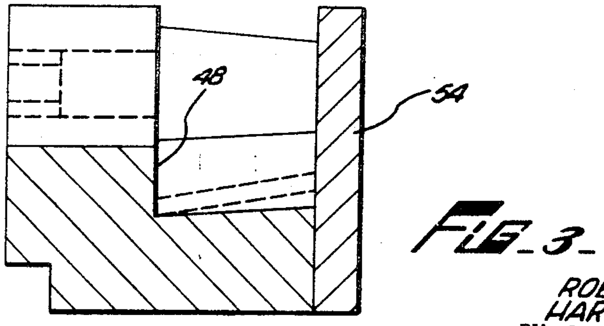
FIGURE 3 is a sectional view taken substantially on the line 3—3 of FIGURE 2.

The present invention improves on the conventional transport by the provision of a pair of guide members 38 and 40 positioned on either side of the transducer 20. Each guide member, as best shown in FIGURES 2 and 3, consists of an elongated block arranged to be bolted to the frame plate 10. The guide members are formed with a flat inclined guide surface 44 with a small pocket 46 formed in the block adjacent one end of the guide surface 44 for receiving a small loop of tape. An integral flange wall 48 is formed in the block 42. A separate flange plate 54 is secured to the outer surface of the block 42 to form a guide channel through which the tape passes in passing over the guide members 38 and 40.

The tape extends out of the pocket 46 around a cylindrical guide post 50, which, for ease of construction, is preferably made of a separate piece from the block 42. The post 50 is arranged with its cylindrical surface being substantially tangential to one edge of the pocket 46 so that the tape, as it passes out of the pocket 46, wraps around the cylindrical surface of the post 50, in the manner shown. The post 50 is arranged so that it extends above the plane of the guide surface 44. The tape, when under tension, lifts off the surface 44 over a substantial portion of the length thereof. The pocket 46 is provided with a port or opening 52 which communicates with a vacuum source by means of which a reduced pressure is maintained in the pocket 46. Thus, a differential air pressure exists across the tape as it passes through the guide members tending to force the tape in a small loop down into the pocket 46 against the action of the tape tension in stretching the tape between the post 50 and the outer end of the guide surface 44.

In order to provide edge guidance of the tape, the surface 44 is slanted or tilted slightly from the normal in relation to the frame plate 10 and the edge guiding surfaces 48 and 54. The guide post 50 is made with a small taper, the outer end of the post being of slightly smaller diameter. Thus, the top surface of the post 50, where the tape passes over it, in effect slants in relation to the normal in the same direction from the surface 44. Likewise, the magnetic transducer head is mounted with the tape engaging surface slanted slightly from the normal in the opposite direction from the surface 44. It has been found that by tilting or slanting the various surfaces in the manner described, as the tape passes through the guide members and under the transducer head, the tape is urged by tape tension against the flange 54 to provide edge guidance.

When a pinch roller engages the tape with a capstan, the tape is withdrawn under tension from the operational zone and, after passing the capstan drive, is discharged into the associated vacuum column. Tension is maintained in the discharge side of the capstan drive only by the action of the vacuum column in pulling the tape loop down into the column by virtue of the air pressure existing across the loop in the column. With the tape and reel initially stationary, when the tape is suddenly accelerated by engagement with the capstan, tape is discharged by the capstan drive more rapidly than the loop can be accelerated in the vacuum column. As a result, tension is momentarily lost in the tape on the discharge side of the capstan. When the slack is again taken up by the movement of the loop in the column, a jerk is imparted to the tape, the shock of which is transmitted along the tape back towards the transducer head, causing a disturbance in the signal being recorded or reproduced from the tape.

To eliminate this effect, a vacuum buffer is provided on the discharge side of the capstan drive. The vacuum buffer element indicated generally at 60 is provided with a pocket 62 formed by a pair of rounded surfaces 64 and 66. The surfaces 64 and 66 converge and are joined at the bottom of the pocket by the rounded bottom surface at 68. The bottom of the pocket is connected to a suitable vacuum source (not shown) by which the air pressure in the pocket is reduced, causing the tape to be drawn in over the converging surfaces 64 and 66 in the manner shown. The pocket is the vacuum buffer 60 maintains tension in the tape by momentarily drawing the tape loop into the pocket sufficiently to absorb any excess tape on the discharge side of the capstan when the pinch roller is engaged.

A similar vacuum buffer 72 is provided on the discharge side of the other capstan for absorbing excess tape when the tape is driven in the opposite direction.

In operation, when the tape is at rest, it normally assumes the position shown by the dotted line position of the tape in the guide member 40; see FIGURE 1. Assuming that the left-hand capstan 26 is engaged, initially only the portion of tape extending between the left-hand vacuum column 22 to the guide post 50 of the left-hand acceleration buffer 38 is accelerated. This causes the tape loop to be drawn into the pocket of the vacuum buffer 60 and to be drawn out of the pocket of the acceleration buffer 38. As the tape is drawn out of the pocket of the acceleration buffer against the pressure pushing it into the pocket, the tension in the tape builds up and the drag of the post is reduced by the unwrapping of the tape on the periphery of the post. A point is reached where the tape begins to accelerate in the region of the magnetic head, causing tape to be withdrawn from the pocket of the right-hand acceleration buffer 40. As the tape continues to accelerate, it is ultimately withdrawn from the right-hand vacuum column 24 and inserted into the left-hand vacuum column 22 until the reel motors are able to accelerate and control the lengths of the loops in the respective columns.

The acceleration buffers 38 and 40 act as a filter in that the step function change in the velocity imparted to the tape at the capstan drive is modified to have a more gradual increase in velocity of the tape in the region of the magnetic head. The effect is to actually reduce the total time required for the tape to come up to a steady state velocity at the magnetic head because the action of the acceleration buffer eliminates any compression waves from traveling along the tape which otherwise cause oscillations in the tape as it accelerates past the magnetic head.

When a stop signal is given and the pinch roller disengages, the tape rapidly decelerates due to the friction between the tape and the various guiding surfaces. As the tension in the tape is relieved, the vacuum in the pockets of the acceleration buffers 38 and 40 draws the tape into the pockets. The effect of the increased wrap of the tape on the guide posts 50 causes the tape to stop almost instantly in the region of the magnetic head and prevents any oscillation of the tape at the head after the capstan is disengaged. Thus, the effect of the acceleration buffers on either side of the transducer head is to produce a smooth, even and very rapid acceleration and deceleration of the tape where it passes over the transducer head. At the same time, the acceleration buffers provide accurate edge guidance of the tape through the region of the magnetic head by means of relatively long stationary guiding surfaces without any moving or spring-loaded parts to cause edge-loading on the tape.

What is claimed is:

1. In a magnetic tape transport apparatus for driving magnetic tape in either direction through an operational zone by means of first and second capstans and means for frictionally engaging the tape with one or the other of said capstans, apparatus comprising a pair of guide members located one on each side of the operational zone between the capstans, each guide member having a semi-cylindrical convex surface adjacent one end, a long flat surface extending from the other end toward the convex surface, and a concave region extending between the flat surface and the semi-cylindrical surface, said surfaces and concave region being slightly wider than the tape, the guide members being positioned such that tape passes from one capstan over the flat surface and around a portion of the semi-cylindrical surface of one guide member, through the operational zone, around the semi-cylindrical surface and over the flat surface of the other guide member to the other capstan, and means for removing air from the concave region of each guide member whereby tape passing over the flat surface and semi-cylindrical surface is drawn into the concave region.

2. Apparatus as defined in claim 1 wherein each of the guide members is provided with flanges extending along either side of the tape contacting surfaces to form an elongated channel portion.

3. In a magnetic tape transport having a pair of rotatable reels for storing tape, apparatus for moving tape from one reel to the other through an operational zone comprising drive means on one side of the operational zone, means for abruptly engaging the tape with the drive means to impart high acceleration to the tape and an acceleration buffer element positioned between the operational zone and the tape engaging means, the buffer element including an elongated channel portion for guiding the tape, a cylindrical drag portion, and a pocket between the cylindrical portion and the channel portion across which the tape passes, the pocket being wider than the tape, and means for evacuating the pocket portion of the buffer element to draw the tape into the pocket against the tension of the tape.

4. In a tape transport for moving tape past a transducer, the combination comprising tape drive means for pulling the tape past the transducer, means abruptly engaging the tape with the drive means to impart high acceleration to the tape in a direction away from the transducer, the engaging means being positioned adjacent the transducer, means positioned between the transducer and the tape engaging means defining a chamber having an opening slightly wider than the tape and having curved surfaces at the margins of the opening to permit the tape to loop into the chamber through the opening, and means for reducing the air pressure in the chamber to force the tape partially into the chamber as it passes from the transducer to the tape engaging means.

5. In a tape transport device for moving tape in either direction across a transducer with rapid starting, stopping and reversing action, the combination comprising first and second tape drive means positioned on either side of the transducer for pulling the tape in opposite directions past the transducer, means for selectively engaging and disengaging the tape with one or the other of said drive means to start and stop the tape in either direction, a pair of buffer elements each storing a small loop of tape positioned with one on each side of the transducer between the first and second drive means, each buffer element having a pocket slightly wider than the tape across which the tape is guided, and means for evacuating the pockets to force the tape into the pockets by differential air pressure against the tension in the tape.

6. Apparatus as defined in claim 5 wherein each buffer element includes a substantially cylindrical tape guide surface adjacent the pocket, the wrap angle of the tape in passing over the pocket increasing as the tape is forced further into the pocket.

7. Apparatus as defined in claim 6 wherein each buffer element further includes an elongated channel portion on the opposite side of the pocket from the cylindrical guide surface, the bottom surface of channel portions lying in a plane passing through the cylindrical surface but not tangential thereto.

8. Apparatus as defined in claim 7 wherein the bottom surface of the channel portions slants in a direction transverse to the direction of tape movement in relation to the cylindrical guide surface and the tape engaging surface of the head, whereby the tape is twisted as it passes through each of the buffer elements.

References Cited by the Examiner

UNITED STATES PATENTS

| | | | |
|---|---|---|---|
| 2,778,634 | 1/57 | Gams et al. | 226—49 X |
| 2,862,715 | 12/58 | MacDonald. | |
| 2,916,228 | 12/59 | Wellington. | |
| 2,952,415 | 9/60 | Gilson | 242—55.12 |
| 3,065,892 | 11/62 | Castelijns | 226—97 |
| 3,091,408 | 5/63 | Schoeneman | 226—97 X |

OTHER REFERENCES

IBM Technical Disclosure Bulletin, volume 2, No. 2, August 1959, page 8.

ROBERT B. REEVES, *Acting Primary Examiner.*

JOSEPH P. STRIZAK, RAPHAEL M. LUPO, ERNEST A. FALLER, Jr., *Examiners.*